(12) United States Patent
Testud

(10) Patent No.: US 8,075,687 B2
(45) Date of Patent: Dec. 13, 2011

(54) HYDRAULIC BINDER COMPRISING A TERNARY ACCELERATION SYSTEM AND MORTARS AND CONCRETES COMPRISING ONE SUCH BINDER

(75) Inventor: Michel Testud, Genas (FR)

(73) Assignee: LaFarge, Paris (FR)

( * ) Notice: Subject to any disclaimer, the term of this patent is extended or adjusted under 35 U.S.C. 154(b) by 846 days.

(21) Appl. No.: 12/066,811

(22) PCT Filed: Sep. 27, 2006

(86) PCT No.: PCT/FR2006/050952
§ 371 (c)(1),
(2), (4) Date: Mar. 13, 2008

(87) PCT Pub. No.: WO2007/039694
PCT Pub. Date: Apr. 12, 2007

(65) Prior Publication Data
US 2008/0257223 A1 Oct. 23, 2008

(30) Foreign Application Priority Data
Sep. 28, 2005 (FR) .................... 05 52940

(51) Int. Cl.
| | |
|---|---|
| C04B 14/40 | (2006.01) |
| C04B 24/36 | (2006.01) |
| C04B 14/12 | (2006.01) |
| C04B 16/08 | (2006.01) |
| C04B 38/00 | (2006.01) |
| C04B 7/14 | (2006.01) |
| C04B 7/19 | (2006.01) |
| C04B 11/00 | (2006.01) |
| C04B 28/14 | (2006.01) |
| C04B 2/10 | (2006.01) |

(52) U.S. Cl. ........ 106/789; 106/715; 106/670; 106/701; 106/602; 106/767
(58) Field of Classification Search ............ None
See application file for complete search history.

(56) References Cited

U.S. PATENT DOCUMENTS

| | | | | |
|---|---|---|---|---|
| 4,715,896 A | * | 12/1987 | Berry | 106/707 |
| 5,580,379 A | * | 12/1996 | Cowan | 106/789 |
| 6,409,819 B1 | * | 6/2002 | Ko | 106/707 |
| 6,793,851 B1 | | 9/2004 | Bompay et al. | |
| 2004/0231569 A1 | * | 11/2004 | Stroup et al. | 106/714 |

FOREIGN PATENT DOCUMENTS
WO WO 91/19687 12/1991

OTHER PUBLICATIONS
PCT Written Opinion of the International Search Authority mailed Apr. 17, 2008.

* cited by examiner

*Primary Examiner* — Jerry A Lorengo
*Assistant Examiner* — Karam Hijji
(74) *Attorney, Agent, or Firm* — Pillsbury Winthrop Shaw Pittman, LLP

(57) ABSTRACT

A hydraulic binder based on slag cement, the slag cement including 20 to 80 weight % relative to a total weight of slag cement, of a blast furnace slag or a mixture of blast furnace slags, relative to the total weight of the slag cement, the hydraulic binder including an acceleration additive that is a ternary system including at least one alkali metal hydroxide in an amount such that, during mixing with water of the hydraulic binder, a molar concentration of the alkali metal hydroxide in the water is from 0.05N to 0.60N, preferably from 0.20N to 0.40N; an alkali metal sulfate at a rate of from 0.2 to 3 weight % of the slag cement; and a source of calcium sulfate in such a proportion that the content of calcium sulfate ($CaSO_4$), relative to the weight of the slag cement, is from 2 to 7%.

21 Claims, No Drawings

HYDRAULIC BINDER COMPRISING A TERNARY ACCELERATION SYSTEM AND MORTARS AND CONCRETES COMPRISING ONE SUCH BINDER

CROSS-REFERENCE TO RELATED APPLICATIONS

This application is the National Phase of International Application No. PCT/FR2006/050952, filed Sep. 27, 2006, which claims priority to French Application No. 0552940, filed Sep. 28, 2005, the entire contents of both applications being hereby incorporated by reference.

BACKGROUND

1. Field of the Invention

The present invention generally provides hydraulic binders based on blast furnace slag and clinker or Portland cement (slag cement) presenting mechanical strengths (compression) after 2 days of at least 8 Mpa and preferably meeting the 32.5 R, 42.5N, or 42.5 R classes according to the EN 197-1 standard, as well as mortars and concretes obtained using such hydraulic binders.

2. Description of Related Art

The development of use of blast furnace slag as a substitution to clinker or Portland cement (slag cement) notably to reduce the $CO_2$ released in the atmosphere per ton of binder, represents a great economic stake for the future. However, the use of slag cement, generally induces obtaining low early mechanical strengths, all the more so when the content of blast furnace slag is high and the temperature is low, and it poses performance regularity problems.

On the other hand, the mechanical strengths obtained after 28 days are generally sufficient. To palliate these insufficient early mechanical strengths accelerating additives are commonly used, notably calcium salts or alkali, sodium or potassium salts such as chlorides, nitrates, nitrites, formates, thiocyanates.

These accelerating additives are used:
either at the concrete batching plant level (concrete application), as admixtures, where it is possible to directly use a cement of the CEM III A or B type, or make in situ a mixture of Portland cement+slag, at the mixer stage.
or at the cement plant level (cement plant application), where they are mixed with the clinker+slag during the production of the slag cement.

The accelerating additives used until today give irregular performances with the slag cements, which vary notably depending on the type of cement, of the batch of cement and of the application temperature. In certain cases, their impact even results in a loss of mechanical strengths at the early ages contrary to what is sought after.

In particular the calcium and sodium chlorides are considered as the best performing accelerators for the slag cements, but they have a very harmful effect in terms of reinforcement corrosion.

SUMMARY

The aim of the invention is to palliate these inconveniences and at the same time obtain on the short term sufficient mechanical strength, particularly to make mortars and concretes with 2-day strengths meeting the 32.5 R, 42.5 N, or 42.5 R classes according to the EN 197-1 standard, or comparable to those obtained with the chlorides.

More particularly the invention provides hydraulic binders based on slag cement containing 20 to 80 weight % of blast furnace slag, corresponding to cements from the CEM III A (containing 36 to 65 weight % of blast furnace slag) and CEM III B (containing 66 to 80 weight % of blast furnace slag) classes in the EN 197-1 standard, and comprising an acceleration additive that is a ternary system comprising at least one alkali metal hydroxide, at least one alkali metal sulfate and at least one source of calcium sulfate.

The hydraulic binders according to the invention can be made in cement plants or reconstituted at the concrete batching plant level, by mixing in situ clinker or Portland cement, and blast furnace slag and the necessary constituents for the ternary acceleration system.

The hydraulic binders according to the invention are used to make mortars and concretes at temperatures going from 5° C. to 30° C. and more particularly from 5° C. to 20° C. and that present early mechanical strengths between 10 hours and 48 hours at least comparable to those obtained with classic accelerators.

The above aims are reached according to the invention by a hydraulic binder based on slag cement comprising 20 to 80 weight % relative to the total weight of the slag cement, of a blast furnace slag or a mixture of blast furnace slags, the complement being clinker or a Portland cement, characterized in that it comprises at least one accelerating additive that is a ternary system comprising:
  at least one alkali metal hydroxide in such an amount that during the mixing in the water of the hydraulic binder, the molar concentration of alkali metal hydroxide in the water is from 0.05 N to 0.60N, preferably from 0.20N to 0.40N;
  at least one alkali metal sulfate present at a rate of 0.2 to 3% in weight of the slag cement; and
  at least one source of calcium sulfate in such proportion that the level of calcium sulfate ($CaSO_4$), relative to the weight of the slag cement is from 2 to 7%.

The present invention also provides a process to make a hydraulic binder based on slag cement, comprising from 20 and 80 weight % relative to the total weight of slag cement of slag or of a mixture of blast furnace slags and the complement being clinker or Portland cement, and giving mechanical strengths after 2 days of at least 8 MPa and preferably meeting the 32.5 R, 42.5N, or 42.5 R classes according to the EN 197-1 standard, as well as mortars and concretes obtained using such hydraulic binders which comprises adding to the slag cement or forming in the core of the slag cement an accelerating additive such as defined above.

The invention also concerns mortars and concretes comprising aggregates and a hydraulic binder such as defined above, notably such mortars and concretes that present preferably 2-day mechanical strengths meeting the 32.5 R, 42.5N, or 42.5 R classes of the EN 197.1 standard.

DETAILED DESCRIPTION

1. The Ternary Acceleration System

The alkali metal hydroxide in the ternary acceleration system according to the invention can be lithium hydroxide, potassium hydroxide, sodium hydroxide or a mixture of two or more of these alkali metal hydroxides.

The level of alkali metal hydroxide in the ternary system and consequently in the hydraulic binder is such that, in the mixing water, the molar concentration in alkali hydroxide is from 0.05N to 0.60N, preferably from 0.20N to 0.40N.

When the mechanical strengths are determined according to the EN 196-1 standard, the mixing water represents 50 weight % relative to the weight of the hydraulic binder, typically, in the case of concretes the mixing water can represent from 20 to 100 weight % relative to the weight of the hydraulic binder.

The alkali metal sulfate can be lithium sulfate, potassium sulfate, sodium sulfate or a mixture of two or more of these alkali metal sulfates.

The dosage of alkali metal sulfate contained in the ternary accelerating system, and consequently in the hydraulic binder, is from 0.2 to 3% relative to the total weight of the slag cement.

The source of calcium sulfate can be gypsum, hemi-hydrate, anhydrite or a mixture of two or more of these sources. The calcium sulfate in the clinker's gypsum additions can be used as a partial or total source of calcium sulfate. Preferably, the calcium sulfate from the clinker's gypsum additions is a partial source and is associated with anhydrite.

The level of the source of sulfate or mixture of sulfate sources in the ternary accelerating system and consequently in the hydraulic binder is such that the amount of calcium sulfate ($CaSO_4$) present in the binder represents 2 to 7 weight % of the slag cement.

The European Cement standard EN 197-1 specifies a maximum 1 weight % addition of additives, these additives not being the secondary constituents or the calcium sulfate; for the cements in the CEM III A and B, classes, the standard also limits the content of $SO_3$ to 4, 5 weight % maximum.

When the additive is added to the slag cement directly at the plant, during its production, the levels of the constituents of the ternary accelerating system according to the invention will be limited, by taking into account that:
The alkali sulfate already present in the clinker should not be taken into account in the calculation; only the added alkali sulfate is to be considered.
The calcium sulfate is not counted as an additive, but it will be taken into account for the content of total $SO_3$.

It is possible to add to the cement when gypsum is added to the clinker, one part or all of the calcium sulfate of the accelerating system, within the limit of the maximum admissible level of $SO_3$. The choice of the nature of the source of calcium sulfate used can be considered in view of an optimization of the ternary system.

When the ternary system is used at the concrete batching plant level, as an admixture, these limitations do not apply and the dosages can be increased.

In this case, the optimization of the dosage of the constituents of the ternary system take into account the content of calcium sulfates and alkali sulfates already introduced in the concrete by the slag cement.

In the case of a concrete application, the calcium sulfate is adjusted as a complement to the calcium sulfate already present by the cement's gypsum addition. It is possible that the calcium sulfate already present in certain cements is sufficient This ternary accelerating system can be associated to any other traditional accelerator such as calcium salts or alkali salts or nucleation additives (germs) that make up preferential germination sites for the calcium silicates and the sulfoaluminates during hydration of the slag cement. These nucleation agents can be amorphous or crystallized calcium silicates, called CSH, alkaline-earth carbonates such as $CaCO_3$, alkaline-earth silicates and their oxides or hydroxides.

The use of the ternary accelerating system instead of chlorides improves the corrosion behavior of the reinforcements.

2. Optimization of the Ternary Accelerating System

Two means are possible to optimize the dosage of the components in the ternary accelerating system:
either this is done by a second degree experimental design, with three factors that are the ternary system's constituents. The optimization is achieved by a mixing procedure with constraints. The constraints can be, for example, a maximum level of alkali sulfate and potassium sulfate to respect the maximum levels specified in the EN 197-1 standard.
or this is done by a two-stage process:
the aim of the first is to determine the optimum dosage of alkali hydroxide by making various binary combinations with, for example, alkali sulfate, preferably when the cement has already received its gypsum addition of calcium sulfate.
the second consists, using the optimum dosage of alkaline hydroxide previously determined, to make ternary combinations where the ratios and dosages will be varied between the alkali sulfate and the calcium sulfate. In this way the optimum dosages of the constituents of the ternary accelerating system are determined.

The same procedure can be followed using during the first stage, calcium sulfate instead of alkali sulfate, preferably when the sulfate has not been added to the cement.

With the various tested dosages of the constituents, the compressive strengths after 2 days can be measured when the tests are done on mortars according to EN 196-1, and when the performances relative to the minimum required for the 32.5 R, 42.5N, or 42.5 R classes are to be positioned. Optimization can also be done on another composition of mortar or on concrete, at an early age considered to be critical, and defined for example, between 10 and 48 hours.

3. The Blast Furnace Slags

All the qualities of blast furnace slag can be used to make a slag cement.

Typically, these blast furnace slags comprise at least 80 weight % relative to the total weight of the slag in a vitreous phase.

The main chemical constituents of these slags as well as their proportions in weight percentages relative to the total weight of the slag are given below:

| | |
|---|---|
| $SiO_2$ | 28 to 40% |
| CaO | 31 to 47% |
| $Al_2O_3$ | 9 to 17% |
| MgO | 0 to 16% |
| $TiO_2$ | 0 to 12% |

The contents of the various constituents can be adjusted by mixing several blast furnace slags.

The blast furnace slags can be more or less reactive. This reactivity is characterized by the hydraulic index HI defined by the formula:

$$HI=(CaO+MgO+Al_2O_3)/(SiO_2)$$

that gives a classification according to the degree of reactivity.

The hydraulic index has been presented, as well as several other slag reactivity indexes in the publications by H. G. Smolczyk at the International Congress of Cement chemistry in Paris 1980, Vol 1. Subject 3.

Typically, the blast furnace slags have a hydraulic index HI from 1.22 to 2.

As mentioned, the hydraulic binder according to the invention can, by mixing with appropriate aggregates, produce mortars and concretes, particularly at temperatures from 5° C. to 30° C., preferably from 5° C. to 20° C., that present compressive strengths after 2 days of at least 8 MPa and meet the 32.5 R, 42.5N, or 42.5 R classes in the EN 197-1 standard when the tests are done at 20° C. according to EN196-1.

To make the mortars and concretes according to the invention one can use any type of aggregate classically used to make mortars and concretes.

As an example, rock aggregates (eruptive, metamorphic or sedimentary rocks) and light artificial aggregates can be mentioned.

Typically, the concretes made according to the invention will be conform to the requirements in the European concrete standard EN 206-1.

The mortars are cement compositions in which the maximum diameter of the biggest aggregate is 5 mm. For these compositions, the weight/weight, hydraulic binder/aggregate ratio, is generally from ¼ to ½.

The mortars and concretes according to the invention can also comprise any classic admixture such as plasticizers/water reducers, superplasticizers, air entrainers, water-retaining agents, etc., such as defined by the NF-EN 934-2 standard.

The following examples illustrate the present invention. In the examples, unless otherwise indicated, all the percentages and parts are given in weight.

Example I

The tests in example 1 were done with standardized mortar at 20° C. according to EN 196-1.

The dosage in water was defined by the water/slag cement ratio=0.50.

Cement A used for these tests was prepared by mixing:
70 weight % of an average reactive slag, with a hydraulic index HI of 1.51.
30 weight % of a Portland clinker containing 70% of alite (C3S), 12.4% of belite (C2S), 9.8% of aluminate (C3A) and 1.1% of ferrites (C4AF). It contained 1.4% of gypsum and 1.2% of hemi-hydrate and 0.6% of alkali sulfate.
In the test (I-1), the dosage of the components of the ternary acceleration system was limited in potassium sulfate so as not to exceed the 1% maximum additive level, permitted at the slag cement level by the EN 197-1, standard, not including the addition of calcium sulfate.
In the test (I-2), the ternary acceleration system was used as an admixture at the concrete batching plant. This made it possible to optimize the dosage of potassium sulfate, without being restricted, in terms of its content, by the cement standard.
Examples with optimum sulfate contents were considered meeting the cement standards notably with cements richer in alkali sulfates.
In all the examples, the dosages are given in weight % relative to slag cement. The content of lithium hydroxide was equivalent to a molar concentration of 0.435N in the mixing water.

| Test N° | Lithium hydroxide | Potassium sulfate | Anhydrite | 2-day strengths |
|---|---|---|---|---|
| Blank | — | — | — | 6.1 MPa |
| I-1 | 0.37% | 0.63% | 2.80% | 12.2 MPa |
| I-2 | 0.37% | 1.62% | 2.80% | 14.2 MPa |

The ternary acceleration system offered in the two cases a significant gain of strength (compression) after 2 days compared to the blank.

The obtained compressive strengths met the requirements of the EN 197-1 standard for the 32.5 R and 42.5N classes.

The same tests were done (I-3) using a cement B prepared by mixing:
50 weight % of a slag with a HI of 1.89
50 weight % of Portland clinker from the composition of the cement A.
The obtained results were the following:

| Test N° | Lithium hydroxide | Potassium sulfate | Anhydrite | 2-day strengths |
|---|---|---|---|---|
| I-3 | 0.37% | 0.63% | 2.80% | 22.0 MPa |

The ternary acceleration system met the 2-day mechanical (compression) strength for the 42.5 R class.

Example II

The aim of example II was to compare the performances obtained with the ternary acceleration system and the calcium chloride; the amounts of the components in the ternary acceleration system used conformed to the maximum content of additive allowed by the EN 197-1 standard. The tests were carried out with the same cement A and in the same conditions as in example I.

In all the tests, the dosages were given in weight % relative to slag cement. The content of lithium hydroxide was equivalent to a molar concentration of 0.435N in the mixing water.

| Test N° | Lithium hydroxide | Potassium sulfate | Anhydrite | Calcium Chloride | 2-day compressive strengths |
|---|---|---|---|---|---|
| Blank | — | — | — | — | 6.1 MPa |
| II-1 | 0.37% | 0.63% | 2.80% | — | 12.2 MPa |
| II-2 comparative | — | — | — | 1 | 10.8 MPa |

The results obtained highlighted that the mechanical strengths (compression) obtained after 2 days with the ternary acceleration system were slightly higher than the one obtained with calcium chloride; it met the minimum level required by the EN 197-1 standard for the 32.5 R and 42.5N classes.

Example III

The tests in example III were also done with standardized mortar according to EN 196-1; the slag cements were made up of 30 weight % of Portland clinker and 70 weight % of L1, L2, L3 slags with different reactivities.

The Portland clinker used was identical to the Portland clinker in example I, but the gypsum addition was different. It contained 1.4% of gypsum, 1.2% of hemi-hydrate and 1.0% of anhydrite. These tests showed that the ternary system accelerated the mixing of the Portland cement and the slag regardless of the slag's reactivity.

Composition of the ternary system used:

| | |
|---|---|
| Lithium hydroxide | 0.37% |
| | (in weight relative to the slag cement). |
| Potassium sulfate | 0.95% |
| Anhydrite | 1.65% |

| | | | 2-day strengths | | |
|---|---|---|---|---|---|
| Test | Slag | HI For the slag used | Blank | 1% Calcium chloride/ mixture of cement + slag | Ternary system |
| III-1 | L1 | 1.84 | 11.6 MPa | 17.1 MPa | 16.5 MPa |
| III-2 | L2 | 1.51 | 7.8 MPa | 12.9 MPa | 13.9 MPa |
| III-3 | L3 | 1.59 | 7.7 MPa | 9.7 MPa | 10.1 MPa |

The obtained results highlighted the polyvalence of the ternary acceleration system that gave, with different slags, equivalent mechanical performances, even better than those obtained with the calcium chloride.

Example IV

The tests in example IV were done at 20° C. on mortars with an equivalent behavior to that of a ready-mix concrete made at a batching plant.

The cement C used for these tests was prepared by mixing:
65.4 weight % of Portland clinker containing 67% of alite (C3S), 13% of belite (C2S), 5.3% of aluminate (C3A) and 7% of ferrites (C4AF).
It contained:
2.7% of gypsum and 1.4% of hemi-hydrate and 0.52% of soluble alkali sulfate.
34.6 weight % of blast furnace slag with a hydraulic index HI of 1.84.
The mortars had the following composition, in kg/m³:
572 kg/m³ of cement C
11458 kg/m3 of 0/4 mm siliceous aggregates from Palvadeau.
309 kg/m³ of water.
The specimens were placed in 4×4×16 cm molds on the vibrating table.

The ternary acceleration system was used here without a supplementary addition of calcium sulfate because the calcium sulfate present in the Portland clinker was sufficient.

| Example N° | Temperature | Lithium hydroxide | Potassium sulfate | 2-day strengths |
|---|---|---|---|---|
| Control group | 20° C. | — | — | 11.8 MPa |
| IV-1 | 20° C. | 0.37% | 1.60% | 16.1 MPa |
| IV-2 | 20° C. | 0.7% | 1.05% | 15.2 MPa |

The content of lithium hydroxide was equivalent to a molar concentration of 0.403N in the mixing water.

These examples showed the strength gains (compression) after 2 days at 2 stages of optimization of the accelerating mixture.

Example V

The tests in example V were done at 20° C. with mortar from example IV.

The aim of these tests was to compare the performances obtained with the ternary acceleration system and the classic accelerators commonly used.

The slag cement was the cement C from example IV;

The composition of the ternary acceleration system used was identical to the one in test IV-1 in example IV.

There was not a supplementary addition of calcium sulfate because the calcium sulfate present in the Portland clinker was sufficient.

The various commercial accelerators, that were calcium chloride, calcium thiocyanate, calcium nitrate, were all dosed at 0.8 weight % relative to the cement C.

| Accelerators | Dosage | Lithium hydroxide | Potassium sulfate | 2-day strengths |
|---|---|---|---|---|
| Blank | — | — | — | 11.8 MPa |
| Calcium chloride | 0.8% | — | — | 12.1 MPa |
| Sodium chloride | 0.8% | — | — | 11.2 MPa |
| Calcium bromide | 0.8% | — | — | 12.2 MPa |
| Calcium thiocyanate | 0.8% | — | — | 10.3 MPa |
| Calcium nitrate | 0.8% | — | — | 10.3 MPa |
| Ternary system | | 0.37% | 1.60% | 16.1 MPa |

The content of lithium hydroxide was equivalent to a molar concentration of 0.403N in the mixing water These accelerators did not significantly improve the strengths compared to the blank that was at 11.8 MPa contrary to the ternary system.

Example VI

The tests in example VI were done at 20° C., with the mortar from examples IV and V, but the Portland clinker in the composition of the slag cement was the Portland clinker from example I.

In this series, the efficiency of the ternary acceleration system was in the same order of magnitude as that of the calcium chloride and slightly higher than other calcium salts. Compared to example V, the difference of sensitivity to the accelerators was imputed to the difference of composition of the Portland clinker used, particularly the content of C3A, the content of free lime and the different forms of sulfates.

| Accelerators | Dosage | Lithium hydroxide | Potassium sulfate | 2-day strengths |
|---|---|---|---|---|
| Blank | — | — | — | 9.7 MPa |
| Calcium chloride | 0.8% | — | — | 14.6 MPa |
| Calcium bromide | 0.8% | — | — | 13.8 MPa |
| Calcium thiocyanate | 0.8% | — | — | 11.6 MPa |
| Calcium nitrate | 0.8% | — | — | 10.3 MPa |
| Ternary system | | 0.37% | 1.60% | 13.2 MPa |

The content of lithium hydroxide was equivalent to a molar concentration of 0.403N in the mixing water.

Example VII

The tests in example VII were done at 10° C. with the composition of mortar and slag cement from example V.

| Test N° | Temperature | Lithium hydroxide | Potassium sulfate | Calcium chloride | 2-day strengths |
| --- | --- | --- | --- | --- | --- |
| VII-1 | 10° C. | 0.37% | 1.1% | | 6.1 MPa |
| VII-2 | 10° C. | 0.37% | 0.50% | | 5.3 MPa |
| VII-3 | 10° C. | 0.37% | 1.60% | | 4.8 MPa |
| Blank | 10° C. | — | — | 0.8% | 3.6 MPa |

The content of lithium hydroxide was equivalent to a molar concentration of 0.403N in the mixing water.

The ternary acceleration system offered, as at 20° C., significant strength (compression) gains after 2 days. In the same conditions, the blank based on calcium chloride at 0.8%, gave 3.6 MPa.

Example VIII

The tests in example VIII were done with standardized mortar at 20° C., according to EN 196-1, with a mixture corresponding to:
- 70 weight % of a slag with average reactivity, with a hydraulic index HI of 1.84.
- 30 weight % of a Portland cement containing 70% of alite (C3S), 12.4% of belite (C2S), 9.8% of aluminate (C3A) and 1.1% of ferrites (C4AF). It contained 1.4% of gypsum and 1.2% of hemi-hydrate and 0.6% of alkali sulfate.

It illustrated the possibility of using different hydroxides such as lithium hydroxide, potassium hydroxide or sodium hydroxide and all the sources of hydroxides obtained from a mixture.

| Test N° | Alkaline hydroxide | Potassium sulfate | Anhydrite | 2-day strengths |
| --- | --- | --- | --- | --- |
| Blank | — | — | — | 6.1 MPa |
| VIII-1 | NaOH 0.62% | 2.0% | 2.55% | 14.1 MPa |
| VIII-2 | LiOH 0.37% | 1.62% | 2.80 | 14.2 MPa |

The content of lithium hydroxide was equivalent to a molar concentration of 0.310 N in the mixing water.

Example IX

The tests in example IX were done on mortars with a behavior equivalent to that of a ready mix concrete made at a batching plant at 20° C.

The mortars had the following composition, in kg/m$^3$:
- 604 kg/m$^3$ of cement D
- 1438 kg/m$^3$ of 0/5 mm aggregates from Brighton Pit
- 4.83 kg/m$^3$ of admixture
- 276 kg/m$^3$ of water.

The dosage of water was defined by the water/cement slag ratio=0.51. The cement D used for these tests was prepared by mixing:
- 20 weight % of slag of average reactivity, with a hydraulic index HI of 1.70
- 80 weight % of a Portland clinker containing 53% of alite (C3S), 20% of belite (C2S), 6% of aluminate (C3A) and 9% of ferrites (C4AF). It contained 1.8% of gypsum and 0.2% of hemi-hydrate and 1.35% of alkali sulfate.

The ternary acceleration system was used here without a supplementary addition of calcium sulfate because the calcium sulfate present in the Portland clinker was sufficient.

In all the tests, the dosages were given in weight % relative to slag cement. The content of sodium hydroxide was equivalent to a molar concentration of 0.273N in the mixing water.

| Test N° | Sodium hydroxide | Sodium sulfate | 1-day strengths |
| --- | --- | --- | --- |
| Control mortar | — | — | 15.9 MPa |
| IX | 0.50% | 0.30% | 17.5 MPa |

The ternary acceleration system offered a significant strength gain (compression) after 1 day compared to the control mortar.

Example X

The tests in example X were done on mortars (test X-1 to X-3) with an equivalent behavior to ready-mix concrete made at a batching plant at 20° C. and at 10° C. and on an ordinary concrete (test X-4) at 20° C.

The cement E used for these tests was prepared by mixing:
- 35 weight % of slag from example IX
- 65 weight % of clinker from example IX The dosage of water was defined by the efficient water/slag cement ratio=0.44.

The ternary acceleration system was used here without a supplementary addition of calcium sulfate because the calcium sulfate present in the Portland clinker was sufficient.

In all the tests, the dosages were given in weight % relative to slag cement. The content of sodium hydroxide was equivalent to a molar concentration of 0.273 N in the mixing water.

The mortars had an identical composition to the one used in example X.

| Test N° | Temperature | Sodium hydroxide | Sodium sulfate | Sodium chloride | 1-day strengths |
| --- | --- | --- | --- | --- | --- |
| Control Mortar | 20° C. | — | — | — | 10.5 MPa |
| X-1 | 20° C. | 0.50% | 0.30% | | 12.8 MPa |
| Comparative X-2 | 20° C. | | | 1% | 13.9 MPa |
| Control mortar | 10° C. | — | — | — | 2.4 MPa |
| X-3 | 10° C. | 0.50% | 0.37% | — | 4.0 MPa |

The ternary acceleration system offered a significant gain of strengths (compression) after 1 day compared to the control test at 20 and at 10° C. This gain was a little lower in this case to the one obtained with a 1% addition of sodium chloride.

The concrete had the following composition, in kg/m$^3$:
- 350 kg/m$^3$ of cement D
- 800 kg/m$^3$ of 0-5 mm aggregates from Brighton Pit
- 605 kg/m$^3$ of 4-20 aggregates from Point Anne
- 495 kg/m$^3$ of 12-20 aggregates from Point Anne
- 2.83 kg/m$^3$ of admixture
- 167 kg/m$^3$ of water

| Test N° | Temperature | Sodium hydroxide | Sodium sulfate | 1-day strengths |
|---|---|---|---|---|
| Control concrete | 20° C. | — | — | 11.1 MPa |
| X-4 | 20° C. | 0.50% | 0.30% | 13.5 MPa |

The gain of strength after 1 day observed on mortar was confirmed on a mix design for ordinary concrete at 20° C.

The invention claimed is:

1. A hydraulic binder based on slag cement, the slag cement comprising 20 to 80 weight % relative to a total weight of slag cement, of a blast furnace slag or a mixture of blast furnace slags, the hydraulic binder comprising at least one acceleration additive that is a ternary system comprising:
   at least one alkali metal hydroxide in an amount such that, during mixing with water of the hydraulic binder, a molar concentration of the at least one alkali metal hydroxide in the water is from 0.05N to 0.60N, the at least one alkali metal hydroxide being selected from the group consisting of lithium hydroxide, sodium hydroxide, potassium hydroxide and mixtures thereof;
   at least one alkali metal sulfate at a rate of from 0.2 to 3 weight % of the slag cement; and
   at least one source of calcium sulfate in such a proportion that the content of calcium sulfate ($CaSO_4$), relative to the weight of the slag cement, is from 2 to 7%,
   wherein the hydraulic binder presents a mechanical strength to compression after 2 days of at least 8 MPa.

2. A hydraulic binder according to claim 1, wherein the blast furnace slag comprises a vitreous phase representing more than 80 weight % of the blast furnace slag.

3. A hydraulic binder according to claim 2, wherein the blast furnace slag comprises, given in relative weight to the total weight of the blast furnace slag from 28 to 40% $SiO_2$, from 31 to 47% CaO, from 9 to 17% $Al_2O_3$, from 0 to 16% MgO, and from 0 to 12% $TiO_2$.

4. A hydraulic binder according to claim 3, wherein the Hydraulic Index HI $(CaO+MgO+Al_2O_3)/(SiO_2)$ in the blast furnace slag is from 1.22 to 2.

5. A hydraulic binder according to claim 1, wherein the alkali metal sulfate of the acceleration agent is selected from among lithium sulfate, sodium sulfate, potassium sulfate and mixtures thereof.

6. A hydraulic binder according to claim 1, wherein the source of calcium sulfate is selected from among gypsum, hemi-hydrates and mixtures thereof.

7. A hydraulic binder according to claim 1, wherein the slag cement is a cement in the CEM III/A or CEM III/B classes according to the EN 197-1 standard.

8. A mortar or concrete comprising aggregates and a hydraulic binder, the hydraulic binder based on slag cement, the slag cement comprising 20 to 80 weight % relative to a total weight of slag cement, of a blast furnace slag or a mixture of blast furnace slags, the hydraulic binder comprising at least one acceleration additive that is a ternary system comprising:
   at least one alkali metal hydroxide in an amount such that, during mixing with water of the hydraulic binder, a molar concentration of alkali metal hydroxide in the water is from 0.05N to 0.60N, the at least one alkali metal hydroxide being selected from the group consisting of lithium hydroxide, sodium hydroxide, potassium hydroxide and mixtures thereof;
   at least one alkali metal sulfate at a rate of from 0.2 to 3 weight % of the slag cement; and
   at least one source of calcium sulfate in such a proportion that the content of calcium sulfate ($CaSO_4$), relative to the weight of the slag cement, is from 2 to 7%,
   wherein the hydraulic binder presents a mechanical strength to compression after 2 days of at least 8 MPa.

9. A mortar according to claim 8, wherein the mortar presents a mechanical strength after 2 days meeting the 32.5 R, 42.5N, or 42.5 R classes in the EN 197-1 standard.

10. A process of making a hydraulic binder based on slag cement comprising 20 to 80 weight % relative to a total weight of slag cement, of a blast furnace slag or a mixture of blast furnace slags, the complement being clinker, and having a mechanical compressive strength after 2 days of at least 8 MPa, the process comprising adding to the slag cement or forming within the slag cement at least one acceleration additive that is a ternary system comprising:
   at least one alkali metal hydroxide in an amount such that, during mixing in water of the hydraulic binder, a molar concentration of the at least one alkali metal hydroxide in the water is from 0.05 N to 0.60N, the at least one alkali metal hydroxide being selected from the group consisting of lithium hydroxide, sodium hydroxide, potassium hydroxide and mixtures thereof;
   at least one alkali metal sulfate at a rate of from 0.2 to 3 weight % of the slag cement; and
   at least one source of calcium sulfate in proportions such that the level of calcium sulfate ($CaSO_4$), relative to the weight of the slag cement, is from 2 to 7%.

11. A process according to claim 10, wherein the blast furnace slag comprises a vitreous phase representing more than 80 weight % of the blast furnace slag.

12. A process according to claim 11, wherein the blast furnace slag comprises, given in relative weight to the total weight of the blast furnace slag from 28 to 40% $SiO_2$, from 3 to 47% CaO, from 9 to 17% $Al_2O_3$, from 0 to 16% MgO, and from 0 to 12% $TiO_2$.

13. A process according to claim 10, wherein the hydraulic index HI=$(CaO+MgO+Al_2O_3)/(SiO_2)$ of the blast furnace slag is from 1.22 to 2.

14. A process according to claim 10, wherein the alkali metal sulfate of the acceleration agent is selected from among lithium sulfate, sodium sulfate, potassium sulfate and mixtures thereof.

15. A process according to claim 10, wherein the source of calcium sulfate is selected from among gypsum, hemi-hydrates, anhydrite and mixtures thereof.

16. A process according to claim 10, wherein the slag cement is a cement of the CEM III/A or CEM III/B classes according to the EN 197-1 standard.

17. A hydraulic binder according to claim 1, wherein the molar concentration of the at least one alkali metal hydroxide in the water is from 0.20N to 0.40N.

18. A hydraulic binder according to claim 6, wherein the source of calcium sulfate is selected from among anhydrite or mixtures of gypsum, hemi-hydrates and anhydrite.

19. A hydraulic binder according to claim 1, wherein the hydraulic binder belongs to the 32.5 R, 42.5N, or 42.5 R classes according to the EN 197-1 standard.

20. A process according to claim 10, wherein the molar concentration of the at least one alkali metal hydroxide in the water is from 0.20N to 0.40N.

21. A process according to claim 15, wherein the source of calcium sulfate is selected from among anhydrite or mixtures of gypsum, hemi-hydrates and anhydrite.

* * * * *